(12) United States Patent
Hajla

(10) Patent No.: US 6,845,565 B2
(45) Date of Patent: Jan. 25, 2005

(54) MONITOR DEVICE

(76) Inventor: Jeanmarie Hajla, 59 Weed Ave., Norwalk, CT (US) 06850

( * ) Notice: Subject to any disclaimer, the term of this patent is extended or adjusted under 35 U.S.C. 154(b) by 0 days.

(21) Appl. No.: 10/028,598

(22) Filed: Dec. 20, 2001

(65) Prior Publication Data

US 2003/0115765 A1 Jun. 26, 2003

(51) Int. Cl.[7] ............................. G01B 3/14; G01B 5/004
(52) U.S. Cl. ............................. 33/436; 33/443; 33/562
(58) Field of Search ....................... 33/430, 436, 437, 33/443, 444, 445, 446, 447, 562, 563, 566

(56) References Cited

U.S. PATENT DOCUMENTS

| | | | | |
|---|---|---|---|---|
| 3,786,568 A | * | 1/1974 | Schulte et al. | 33/437 |
| 4,426,789 A | * | 1/1984 | Goodrich | 33/444 |
| 4,481,719 A | * | 11/1984 | Grover | 33/437 |
| 4,503,615 A | * | 3/1985 | Schreiber | 33/430 |
| 4,599,798 A | * | 7/1986 | Steele | 33/566 |
| 4,632,529 A | * | 12/1986 | Levin | 33/430 |
| 6,418,630 B1 | * | 7/2002 | Genevois | 33/430 |
| 2002/0078581 A1 | | 6/2002 | Negad-Sattari | 33/563 |

* cited by examiner

*Primary Examiner*—Christopher W. Fulton
(74) *Attorney, Agent, or Firm*—Kramer, Levin, Naftalis & Frankel LLP

(57) ABSTRACT

A monitor device for marking a reference location on a computer screen. The reference location can be, for example, a data point on the screen that a user needs to note. This would be advantageous, for example, when the user is checking a spreadsheet of data. Often when the user refers back and forth between a computer screen and a hard copy, the user loses track of the user's place on the screen. The monitor guide can be used to keep track of where the user is on the screen. The monitor guide features two rods that move with respect to the screen and intersect at a point used to mark the reference point.

22 Claims, 4 Drawing Sheets

US 6,845,565 B2

MONITOR DEVICE

FIELD OF THE INVENTION

The present invention relates to a guide suitable for keeping track of coordinates on a computer screen.

BACKGROUND OF THE INVENTION

When working with a computer, a user is often faced with inputting or verifying an array of numbers. For example, when viewing a spreadsheet, the entire screen of a computer may be filled with rows and columns of numbers or other types of data. If the user is comparing the values on the computer screen to a hard copy in front of him, the user may often lose track of the user's position since the user is constantly switching between the screen and hard copy. Having a device that allows the user to efficiently switch between the screen and hard copy facilitates efficiency.

In another example, the user may be drawing a figure or picture on the computer screen and needs to locate the corresponding coordinates on the same-scaled hard copy of the drawing. Without a guide, the user may have difficulty in finding the corresponding coordinates.

A need thus exists for a guide that can be mounted to a computer monitor in order to identify coordinates and their corresponding locations on the computer screen.

SUMMARY OF THE INVENTION

The present invention features a detachable monitor guide for a computer screen that allows a user to keep the user's place on the screen when turning the user's attention to something else. In an exemplary embodiment of the present invention of the monitor guide, two rods attached to the monitor guide and oriented orthogonal to each other are used to mark reference points on the screen and hard copy.

The two rods can be moved in a plane parallel to the monitor guide, and intersect at a particular reference location. This reference location can be used to pinpoint a particular object on a computer screen or monitor. If the user has a hard copy of the visual displayed on the screen, then the monitor guide can be removed from the monitor and placed over the hard copy to pinpoint the object that was being viewed on the monitor on the hard copy.

BRIEF DESCRIPTION OF THE DRAWINGS

The accompanying drawings, which are incorporated in and constitute a part of the specification, illustrate an exemplary embodiment of the present invention.

DETAILED DESCRIPTION OF THE INVENTION

Figure 1:
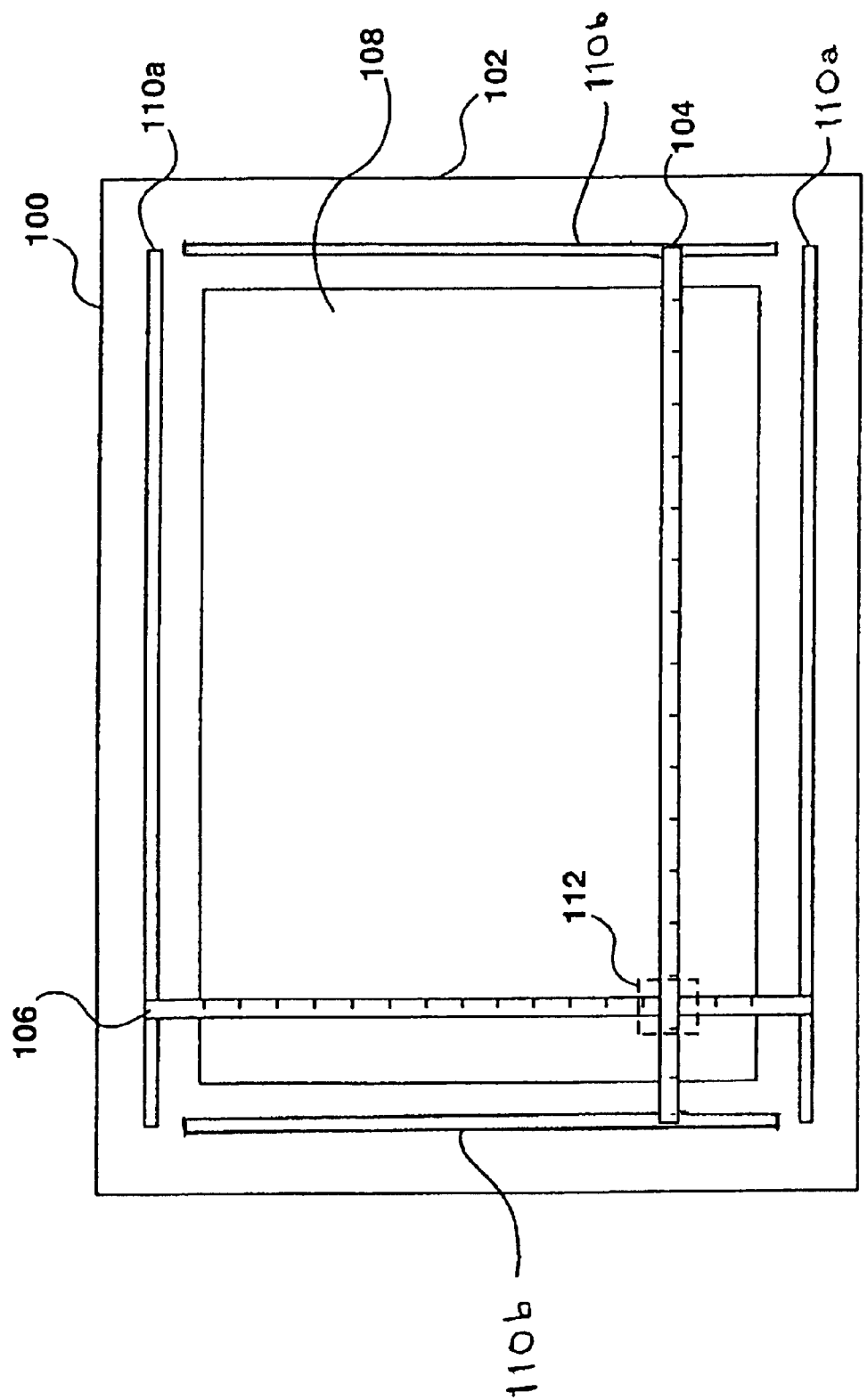
FIG. 1 is a front view of the guide according to an exemplary embodiment of the present invention.

FIG. 1 is a front view of guide 100. Guide 100 includes, for example, border 102, horizontal rod 104, vertical rod 106, viewing portion 108, and grooves 110a and 110b. Viewing portion 108 should be of a dimension sufficient to allow the contents of a computer screen to be seen without any obstructions. For example, viewing portion 108 should be large enough to accommodate the screens of commonly used monitors, for example thirteen-inch, fifteen-inch, and seventeen-inch monitors as are commonly known. Alternatively, viewing portion 108 can be small such that it accommodates the screens of handheld computers such as personal data assistants. Although the viewing screen should not cover any part of the monitor, this is not an absolute requirement. In certain embodiments, the viewing screen can be made to be adjustable such that only a portion of the screen is viewable. In certain scenarios, it may be desired for part of the computer screen to be covered. Thus, for example, viewing portion 108 can take the shape of a polygon, e.g., a square, rectangle, etc. Alternatively, viewing portion 108 can be circular, semicircular, ovoid, or semi-ovoid. Viewing portion 108 can be of a transparent material such as plastic or can simply be a hole or any other suitable material.

Surrounding the perimeter of viewing portion 108 is border 102. Border 102 can be made of plastic, wood, metal or any combination thereof. Suitable plastics include, but are not limited to polyethylene, polyvinyl chloride, poly (methylmethacrylate), polystyrene, polycarbonate, and polypropylene. Border 102 may have multiple edges. For example, if border 102 is in the shape of a quadrilateral, then there are four edges. In the case of circular shapes, border 102 has multiple arcs. In border 102, at least two of the edges have grooves. The edges with grooves can be adjacent, or opposite, to each other. For example, in a rectangular configuration, both of the width edges have grooves 110b. Illustrated in the exemplary embodiment of FIG. 1 is a rectangular border 102 with four edges and four grooves 110a and 110b, one in each edge.

Inserted within grooves 110a is, for example, vertical rod 106. Vertical rod 106 has two ends with each end being inserted in one of grooves 110a. Vertical rod 106 can be any shape with a high aspect ratio, for example a cylinder. In the case of a cylinder, the ratio of the length of the cylinder to the diameter forms a high aspect ratio. In another exemplary embodiment, vertical rod 106 can be a rectangle with a high ratio of the length to the width. A high aspect ratio can range from about fifty to about two hundred, for example about one-hundred and forty. Vertical rod 106 can be made of any rigid material such as wood, plastic or metal. Vertical rod 106 is able to slide within the grooves in a horizontal fashion. Vertical rod 106, for example, measures the x-coordinate on a computer screen.

Similarly, horizontal rod 104, with similar aspect ratios to vertical rod 106, is inserted in grooves 110b. Horizontal rod 104, however, measures the y-coordinate on a computer screen. The intersection of vertical rod 106 and horizontal rod 104 form intersection 112. Horizontal rod 104 and vertical rod 106, for example, can be arranged orthogonal to each other. In addition to right angles, horizontal rod 104 and vertical rod 106 can be arranged at any angle less than ninety degrees. For example, horizontal rod 104 and vertical rod 106 can form an angle of forty-five degrees. Intersection 112 is used to mark a reference location on the screen. Reference location means a point on the monitor that the user will refer to. Each rod 104 or 106 can be marked in units (e.g., English or metric units) to allow rod 104 or 106 to function as a ruler. For example, rod 104 or 106 can be marked with metric units to allow it to become a metric ruler. Furthermore, each rod 104 or 106 can be transparent or lightly colored.

Figure 2:
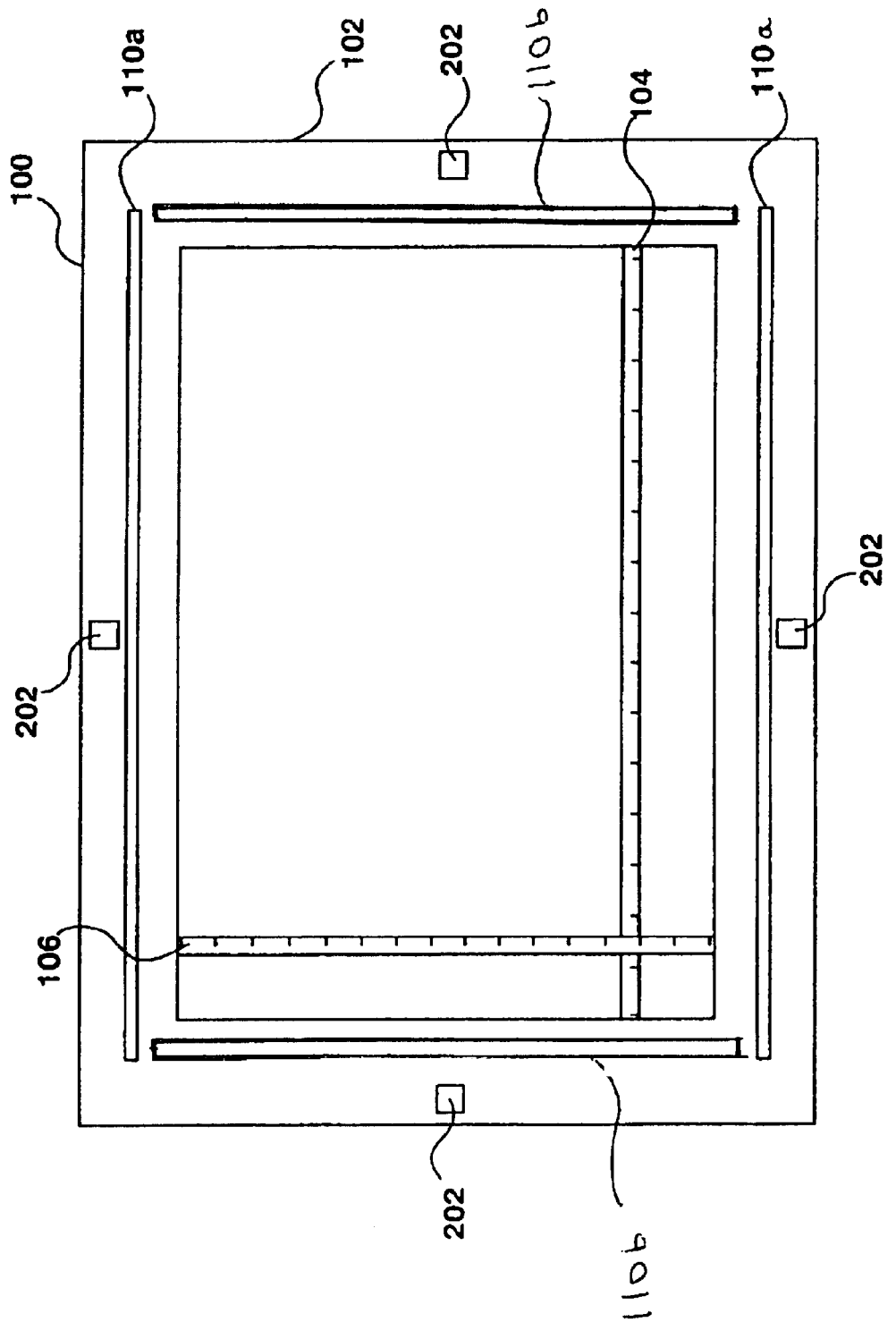
FIG. 2 is a rear view of the guide according to an exemplary embodiment of the present invention.

FIG. 2 shows a rear view of guide 100 according to an exemplary embodiment of the present invention. On the back side of border 102 is mounting component 202. For example, as shown in FIG. 2, mounting component 202 is located on each edge of border 102, and can be placed at each corner of the guide 100 or at the midpoints of each edge. Mounting component 202 is used to mount guide 100 on a computer screen. Mounting component 202 can be an adhesive, hook and loop fastener, magnet, fun tack, or any other compound suitable for joining as known in the art.

Figure 3:
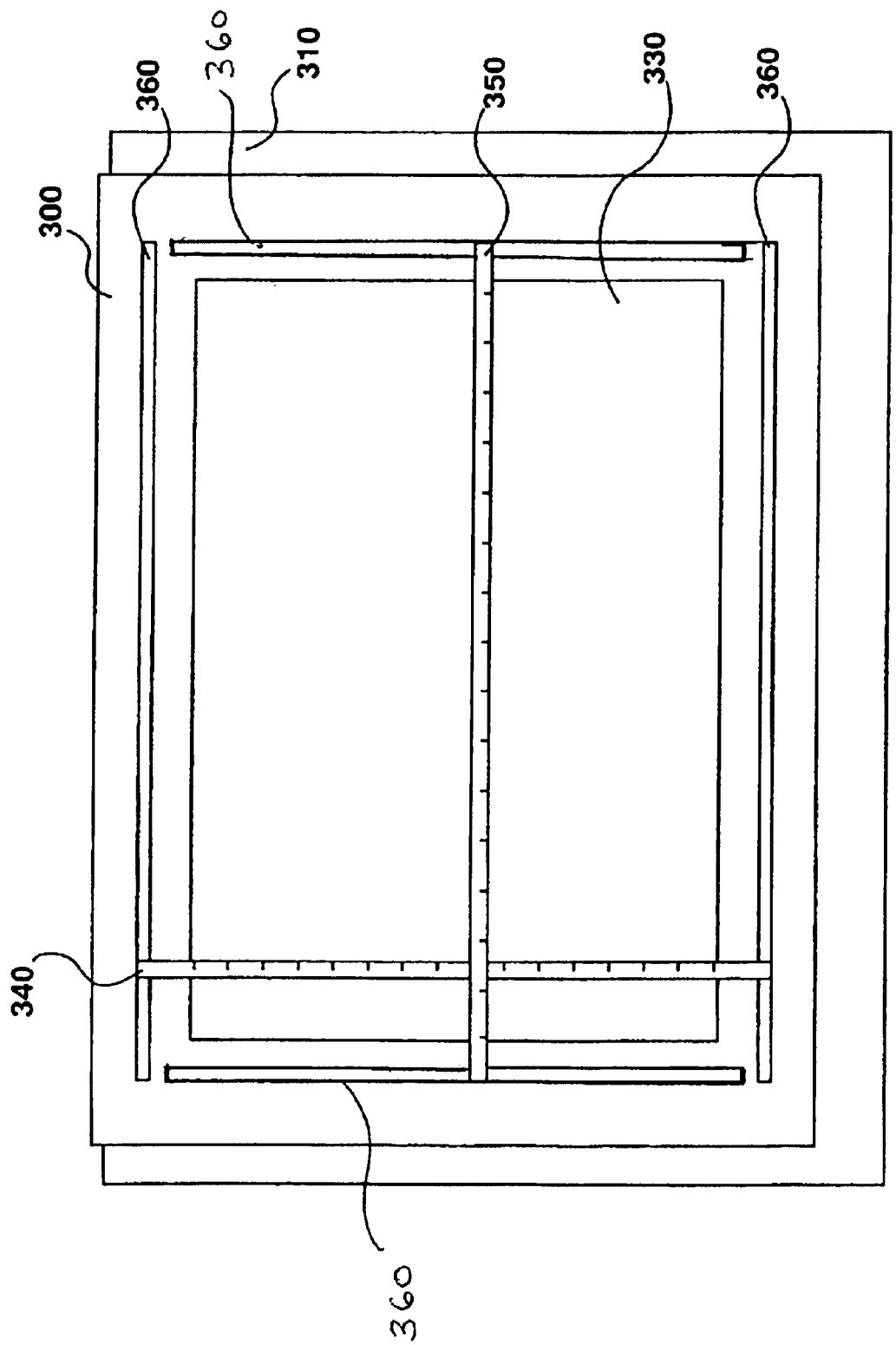
FIG. 3 illustrates the guide attached on a computer monitor according to an exemplary embodiment of the present invention.

FIG. 3 shows attachment of the guide 300 to a monitor 310. The guide 300 is placed on a monitor with the viewing portion 320 matched up against the screen 330 of monitor 310. When mounted, vertical rod 340 and horizontal rod 350 are held in place against the screen 330 by grooves 360. Vertical rod 340 and horizontal rod 350 should have enough mobility such they are able to slide horizontally and vertically respectively.

Figure 4:
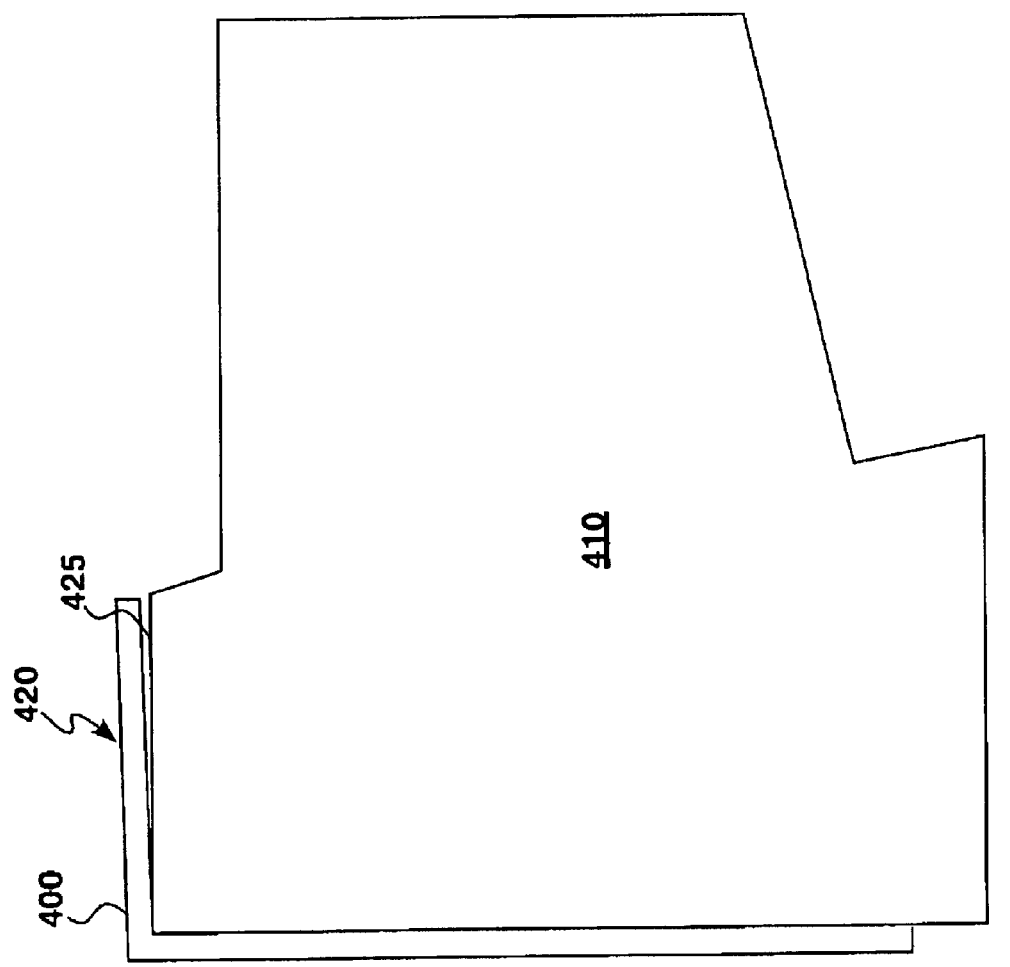
FIG. 4 is a side view of a guide having a lip according to an exemplary embodiment of the present invention.

FIG. 4 shows a side view of the attachment of the guide 400 to a monitor 410 through the use of a lip 420. Lip 420 is shaped as a plane and attached to the guide 100 perpendicular to a border of the guide 100, for example, the top border. Lip 420 can be of a single construction with the guide 100 or separately fastened through the use of fasteners, for example screws or hinges. Lip 420 allows the guide 400 to be attached to the monitor. Lip 420 has a contact surface 425 that connects to the monitor 410 through the use of gravity, a mounting component (similar to those described above) or friction.

The following illustrates the use of a monitor guide according to an exemplary embodiment of the present invention. For example, on the screen of a computer is a spreadsheet filled with data that is arranged in columns and rows. If the user were verifying that the columns of numbers matched an existing spreadsheet, then the user would slide the vertical rod to line up against the column of data that the user is currently checking. Once the column of data on the screen is marked by the guide, the user is free to look away from the monitor and consult a hard copy of the data and proceed with the checking of the values, i.e., the value on the screen matching the value on the paper. Similarly, the user can follow the same method for the rows of a spreadsheet.

Alternatively, if one of the data points looks incorrect, the user can mark the location of that data point by the intersection of the horizontal and vertical rods. Once marked, the user can proceed to other tasks to verify that the data point is indeed correct. The marking of the data point by the guide allows the user to quickly refer back to that data point.

In addition to use on the computer, the guide can also be used to non-permanently mark data points on the hard copy. Two guides can also be used concurrently, one for the computer and one for the hard copy, to facilitate the comparisons.

If the rods are ruled, then the rods can be used as rulers to measure distances and sizes on the screen or on a hardcopy. Furthermore, if the screen and hard copies, e.g., print-outs, are of the same scale, i.e. WYSIWYG (or, What You See Is What You Get) then, the values or distances measured on the computer screen would correlate to a respective point on the hard copy and vice versa. Moreover, any reference points marked on the computer screen can be easily located on the hard copy by using the guide.

Additional advantages and modifications will readily occur to those skilled in the art. Therefore, the present invention in its broader aspects is not limited to the specific details and representative devices shown and described herein. Accordingly, various modifications may be made without departing from the spirit or scope of the general inventive concept as defined by the appended claims.

What is claimed is:

1. A guide, comprising:
   a frame, releasably attachable to a computer screen, comprising a viewing portion;
   a first bar movably attached to said frame wherein said first bar crosses said viewing portion
   a second rod movably attached to said frame wherein said second bar crosses said viewing portion and intersects said first bar,
   wherein each of the first and second bars are:
      made of one of a rigid or a semi-rigid material, and
      substantially transparent.

2. A guide according to claim 1, wherein said frame is attached to the computer screen by a mounting component.

3. A guide according to claim 2, wherein said mounting component includes an adhesive, a hook and latch fastener or a magnet.

4. A guide according to claim 1, wherein said frame has a quadrilateral shape.

5. A guide according to claim 4, wherein said quadrilateral shape is a rectangle having a pair of long sides and a pair of short sides.

6. A guide according to claim 5, wherein said first bar is oriented in a direction of said pair of long sides and said second bar is oriented in a direction of said pair of short sides.

7. A guide according to claim 6, wherein an intersection of said first bar and said second bar form a right angle.

8. A guide according to claim 7, wherein said first bar and said second bar have high aspect ratios.

9. A guide according to claim 1, wherein said frame is transparent.

10. A guide according to claim 9, wherein said frame is made of acrylic.

11. A guide according to claim 1, further comprising a lip attached to said frame.

12. The guide of claim 1, where said first bar is attached to a first pair of grooves in said frame and said second bar is attached to a second pair of grooves in said frame.

13. A guide, comprising:
   a frame having a viewing portion and attachable to a computer screen, wherein said viewing portion is of a same dimension as the computer screen;
   a first bar movably attached to said frame wherein said first bar crosses said viewing portion;
   a second bar movably attached to said frame wherein said second rod crosses said viewing portion and intersects said first bar; and
   a mounting component wherein said mounting component is used to attach said frame to said computer screen;
   wherein each of the first and second bars are:
      made of one of a rigid or a semi-rigid material, and
      substantially transparent.

14. A guide according to claim 13, wherein said mounting component includes an adhesive, a hook and latch fastener or a magnet.

15. A guide according to claim 13, wherein said frame has a quadrilateral shape.

16. A guide according to claim 15, wherein said rectangular shape is a rectangle having a pair of long sides and a pair of short sides.

17. A guide according to claim 16, wherein said first bar is oriented in a direction of said pair of long sides and said second bar is oriented in a direction of said pair of short sides.

18. A guide according to claim 17, wherein an intersection of said first bar and said second bar form a right angle.

19. A guide according to claim 18, wherein said first bar and said second bar have high aspect ratios.

20. A guide according to claim 13, wherein said frame is transparent.

21. A guide according to claim 20, wherein said frame is made of acrylic.

22. The guide of claim 13, where said first bar is attached to a first pair of grooves in said frame and said second bar is attached to a second pair of grooves in said frame.

\* \* \* \* \*